US012109838B2

(12) United States Patent
Fukuda et al.

(10) Patent No.: US 12,109,838 B2
(45) Date of Patent: Oct. 8, 2024

(54) APPARATUS FOR PRODUCING TRANSFER MEDIUM AND TRANSFER MEDIUM

(71) Applicant: RISO KAGAKU CORPORATION, Tokyo (JP)

(72) Inventors: Mamoru Fukuda, Tokyo (JP); Shoji Naramoto, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 18/118,950

(22) Filed: Mar. 8, 2023

(65) Prior Publication Data

US 2023/0294448 A1 Sep. 21, 2023

(30) Foreign Application Priority Data

Mar. 18, 2022 (JP) ................................ 2022-043638

(51) Int. Cl.
*B44C 1/17* (2006.01)
*B41M 3/12* (2006.01)
*B41J 3/407* (2006.01)

(52) U.S. Cl.
CPC ............ *B44C 1/1712* (2013.01); *B41M 3/12* (2013.01); *B41J 3/4078* (2013.01)

(58) Field of Classification Search
CPC ....... B44C 1/1712; B41M 3/12; B41J 3/4078; G06K 15/1856; G06K 15/186; G06V 10/70
See application file for complete search history.

(56) References Cited

U.S. PATENT DOCUMENTS 7,102,657 B2 * 9/2006 Chamandy .............. D06H 1/02 347/171
9,862,206 B2 * 1/2018 Chung .................. B41J 3/4078

FOREIGN PATENT DOCUMENTS

JP 2003-154793 A 5/2003

* cited by examiner

*Primary Examiner* — Gerard Higgins
(74) *Attorney, Agent, or Firm* — GREENBLUM & BERNSTEIN, P.L.C.

(57) ABSTRACT

An apparatus for producing a transfer medium is equipped with: a printing unit that receives image data that represents an image to be printed and prints a print image onto a peelable sheet based on the image data; an adhesive liquid coating unit that coats an adhesive liquid on the peelable sheet on which the print image has been printed; and a control unit that controls the adhesive liquid coating unit such that an adhesive liquid is coated onto a printed image within a transfer region, from between the transfer region to be transferred onto a target medium for transfer and a non-transfer region not to be transferred onto the target medium for transfer, which are included in the printed image.

3 Claims, 6 Drawing Sheets

APPARATUS FOR PRODUCING TRANSFER MEDIUM AND TRANSFER MEDIUM

CROSS-REFERENCE TO RELATED APPLICATIONS

The present application claims priority under 35 U.S.C. § 119 to Japanese Patent Application No. 2022-043638, filed on Mar. 18, 2022. The above applications are hereby expressly incorporated by reference, in these entireties, into the present application.

BACKGROUND OF THE INVENTION

1. Field of the Invention

The present disclosure is related to an apparatus for producing a transfer medium for transferring a printed image which is printed on a peelable sheet onto a target medium for transfer, and a transfer medium.

2. Description of the Related Art

Transfer mediums for transferring printed images, which are printed on peelable sheets such as films, onto a target medium for transfer, are conventionally known (refer to Japanese Unexamined Patent Publication No. 2003-154793, for example).

In addition, the types of target media for transfer are increasing, and transfer mediums for transferring printed images onto cloth products such as T shirts have been proposed recently.

SUMMARY OF THE INVENTION

Here, when transferring a printed image onto a T shirt employing a transfer medium, there is no reference for positionally aligning the T shirt and the printed image. Therefore, there is a problem that the position of the printed image on the T shirt is not constant.

In order to solve this problem, printing references for positional alignment such as trim marks may be considered. However, if the trim marks are also transferred onto a T shirt, there is a problem that the design aesthetics will extremely deteriorate.

Further, there are patterns, text, and images which are desired to be printed onto a transfer medium but not to be transferred onto a target medium for transfer, in addition to the aforementioned trim marks. For example, management of transfer media will be facilitated if management barcodes and production dates are printed on the transfer media. However, there are cases in which it is not desirable for such patterns and text to be transferred onto the target medium for transfer.

The present disclosure provides an apparatus for producing a transfer medium capable of producing a transfer medium that transfers only a desired printed image onto a target medium for transfer and improves convenience and utility, as well as a transfer medium produced by the apparatus.

An apparatus for producing a transfer medium of the present disclosure is equipped with: a printing unit that receives image data that represents an image to be printed and prints a print image onto a peelable sheet based on the image data; an adhesive liquid coating unit that coats an adhesive liquid on the peelable sheet on which the print image has been printed; and a control unit that controls the adhesive liquid coating unit such that an adhesive liquid is coated onto a printed image within a transfer region, from between the transfer region to be transferred onto a target medium for transfer and a non-transfer region not to be transferred onto the target medium for transfer, which are included in the printed image.

According to the apparatus for producing a transfer medium of the present disclosure, an adhesive liquid is coated onto a printed image within a transfer region, from between the transfer region to be transferred onto a target medium for transfer and a non-transfer region not to be transferred onto the target medium for transfer, which are included in a printed image. Therefore, only a desired printed image within the transfer region can be transferred onto a target medium for transfer. In addition, a printed image within a non-transfer region can be utilized for purposes other than image transfer, thereby improving convenience and utility.

DETAILED DESCRIPTION OF THE EMBODIMENTS

Figure 1:
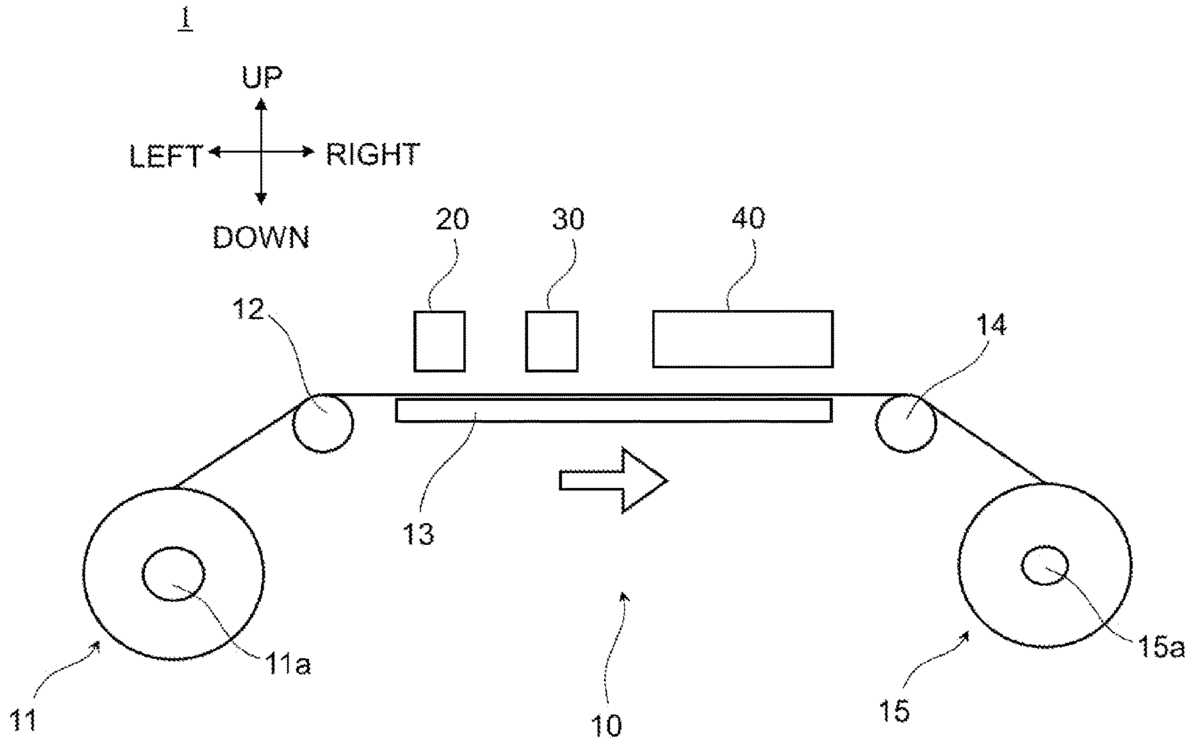
FIG. 1 is a diagram that illustrates the schematic configuration of a transfer medium producing apparatus main body according to an embodiment of the present disclosure.

Hereinafter, a transfer medium producing apparatus according to an embodiment of the present disclosure will be described in detail with reference to the attached drawings. The transfer medium producing apparatus of the present embodiment is characterized by a method of coating an adhesive liquid onto a transfer medium. First, the configuration of the transfer medium producing apparatus main body as a whole will be described. FIG. 1 is a diagram that illustrates the schematic configuration of a transfer medium producing apparatus main body 1 according to the present embodiment. Note that in the present embodiment, the up, down, left, and right directions in FIG. 1 are designated as the up, down, left, and right directions of the transfer medium producing apparatus main body 1. The direction toward the viewer from the drawing sheet of FIG. 1 is designated as the front direction of the transfer medium producing apparatus main body 1, and the direction away from the viewer from the drawing sheet of FIG. 1 is designated as the back direction of the transfer medium producing apparatus main body 1.

The transfer medium producing apparatus main body 1 of the present embodiment is equipped with a peelable sheet conveying unit 10, a printing unit 20, an adhesive liquid coating unit 30, and a drying unit 40.

The peelable sheet conveying unit 10 conveys a peelable sheet to supply the peelable sheet to the printing unit 20, the adhesive liquid coating unit 30, and the drying unit 40 in this order. A film, for example, may be employed as the peelable sheet. However, the present disclosure is not limited to such a configuration, and any material may be employed as long as it is possible to print a print image thereon, and the material is capable of transferring the print image to a target of transfer.

The peelable sheet conveying unit 10 is equipped with a peelable sheet feeding unit 11, a first conveyance roller 12, a platen 13, a second conveyance roller 14, and a peelable sheet winding unit 15.

The peelable sheet feeding unit 11 is provided with a feeding side roll holding unit 11*a* for removably holding the core of a roll member about which a peelable sheet S is wound in the form of a roll. The feeding side roll holding unit 11*a* is coupled to a feeding drive motor 11*b* (refer to FIG. 2) via a torque limiter (not shown), and is configured to be rotated by the feeding drive motor 11*b*.

The peelable sheet winding unit 15 is equipped with a winding side roll holding unit 15*a* for removably holding a core about which the peelable sheet S is wound. The winding side roll holding unit 15*a* is coupled to a winding drive motor 15*b* (refer to FIG. 2) via a torque limiter (not shown), and is configured to be rotated by the winding drive motor 15*b*.

The first conveyance roller 12, the platen 13, and the second conveyance roller 14 are provided between the peelable sheet feeding unit 11 and the peelable sheet winding unit 15.

The first conveyance roller 12 and the second conveyance roller 14 are roller members which are provided to extend in the front to back direction, and convey the peelable sheet S which is fed out from the peelable sheet feeding unit 11.

The first conveyance roller 12 is provided upstream from the printing unit 20 in the conveyance direction of the peelable sheet S, and the second conveyance roller 14 is provided downstream from the drying unit 40 in the conveyance direction of the peelable sheet S. The platen 13 is provided between the first conveyance roller 12 and the second conveyance roller 14.

The first conveyance roller 12 and the second conveyance roller 14 are installed such that the apexes of the peripheral surfaces thereof are at the same height as the upper surface of the platen 13. Thereby, the lower surface of the peelable sheet S which is conveyed toward the downstream side from the first conveyance roller 12 to the second conveyance roller slidably contacts the upper surface of the platen 13.

The roll member (peelable sheet S) which is held by the feeding side roll holding unit 11*a* is fed out and is wound by the core which is held by the winding side roll holding unit 15*a* via the first conveyance roller 12, the platen 13, and the second conveyance roller 14 by rotation of the feeding side roll holding unit 11*a* and the winding side roll holding unit 15*a*.

The printing unit 20 administers a printing process onto the peelable sheet S as it is conveyed on the platen 13. Specifically, the printing unit 20 is equipped with an inkjet head that ejects ink. The printing process is administered by the inkjet head ejecting ink onto the peelable sheet S.

The printing unit 20 is equipped with four inkjet heads, for example, and each of the inkjet heads respectively C (cyan), M (magenta), Y (yellow), and K (black) ink. The printing unit 20 may be of a configuration that performs printing by the so-called serial head method, in which printing is performed while moving the four inkjet heads in a direction perpendicular to the conveyance direction of the peelable sheet S, or may be of a configuration that performs printing by the line head method, in which a plurality of inkjet heads that eject the same color ink are arranged in a direction perpendicular to the conveyance direction of the peelable sheet S and forms line heads.

The adhesive liquid coating unit 30 has inkjet heads in the same manner as the printing unit 20, and ejects an adhesive liquid from the inkjet heads instead of ink, to form an adhesive layer on the peelable sheet on which a print image has been printed. The adhesive liquid coating unit 30 may be of a configuration that ejects the adhesive liquid by the serial head method or a configuration that ejects the adhesive liquid by the line head method, in the same manner as the printing unit 20. It is possible to form the adhesive layer on desired ranges on the peelable sheet S, the adhesive layer being formed by the inkjet heads ejecting the adhesive liquid as in the present embodiment.

Any known adhesive liquid may be used as the adhesive liquid. A liquid in which fine capsules having an adhesive agent encapsulated therein are dispersed, as disclosed in Japanese Unexamined Patent Publication No. 2011-37014 may be employed, for example. The adhesive liquid is ejected onto a printed image from the inkjet heads and adheres thereon in a state in which the capsules are maintained. Then, the capsules are broken during transfer of the printed image by application of heat and pressure, and strong adhesive properties are generated.

The drying unit 40 is equipped with a heater, a fan, etc. The drying unit dries the adhesive liquid by blowing warm air onto the peelable sheet S which is coated with the adhesive liquid.

Figure 2:
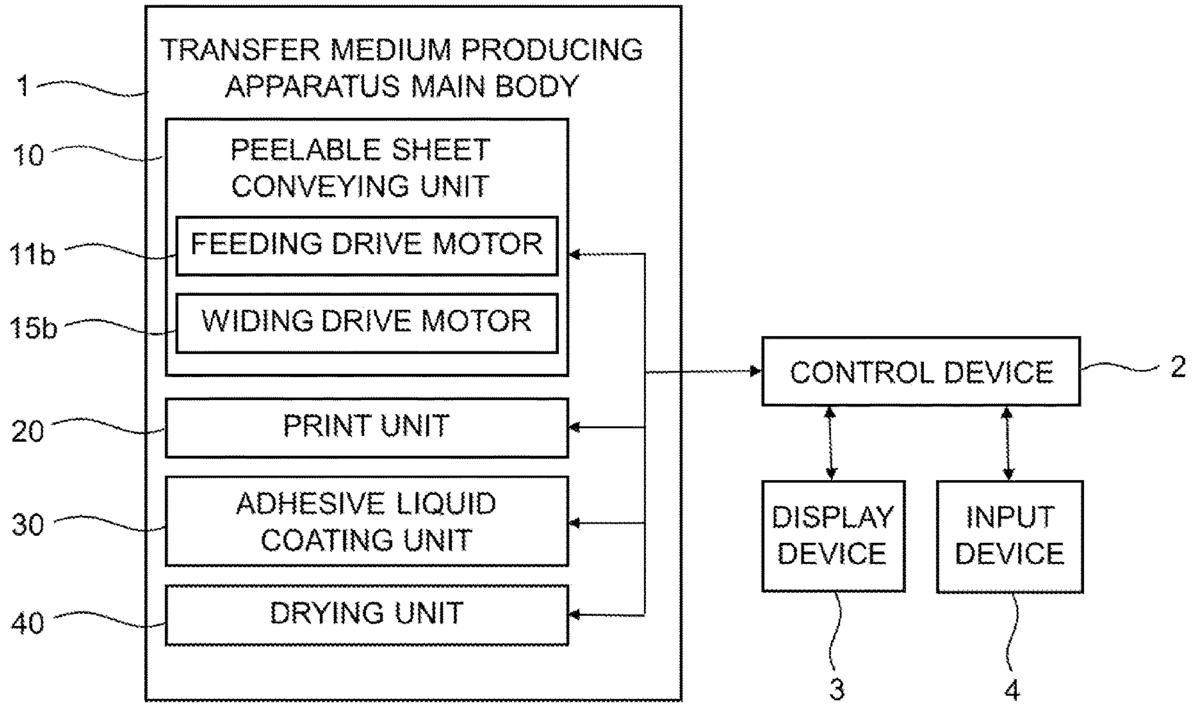
FIG. 2 is a block diagram that illustrates the configuration of a control system of the transfer medium producing apparatus main body illustrated in FIG. 1.

Next, FIG. 2 is a block diagram that illustrates the configuration of a control system of the transfer medium producing apparatus. The transfer medium producing apparatus main body 1 illustrated in FIG. 1 operates each of the components illustrated in FIG. 2 which is a target of control based on control signals from a control device 2. Note that in the present embodiment, the control device 2 corresponds to the control unit of the present disclosure.

The control device 2 and the transfer medium producing apparatus main body 1 are connected by a USB (Universal Serial Bus) connection. Alternatively, the control device 2 and the transfer medium producing apparatus main body 1 may be connected via a LAN (Local Area Network) or a communications network such as the Internet.

The control device 2 is constituted by a computer equipped with a CPU (Central Processing Unit), a semiconductor memory, a hard disk, etc. The control device 2 executes a control program which is stored in advance in a recording medium such as the semiconductor memory or the hard disk and operates electric circuits based on image that that represents an image to be printed, to control each of the components illustrated in FIG. 2.

Particularly, the control device 2 controls the printing unit 20 to form a printed image on the peelable sheet S, and controls the adhesive liquid coating unit 30 coat the adhesive liquid on the peelable sheet S on which the printed image has been formed.

Here, an example of a printed image which is printed by the transfer medium producing apparatus of the present embodiment will be described. A case in which a target of transfer is a T shirt will be described.

In the case that a printed image is to be transferred from a transfer medium onto a T shirt, it is necessary to positionally align a transfer medium with respect to the T shirt, in order to transfer the printed image onto a desired position on the T shirt. In the present embodiment, positional alignment images (trim marks) for performing the aforementioned positional alignment are printed on the peelable sheet S. Hereinafter, a printed image to be transferred onto the T shirt among printed images will be referred to as a "transfer image".

Figure 3:
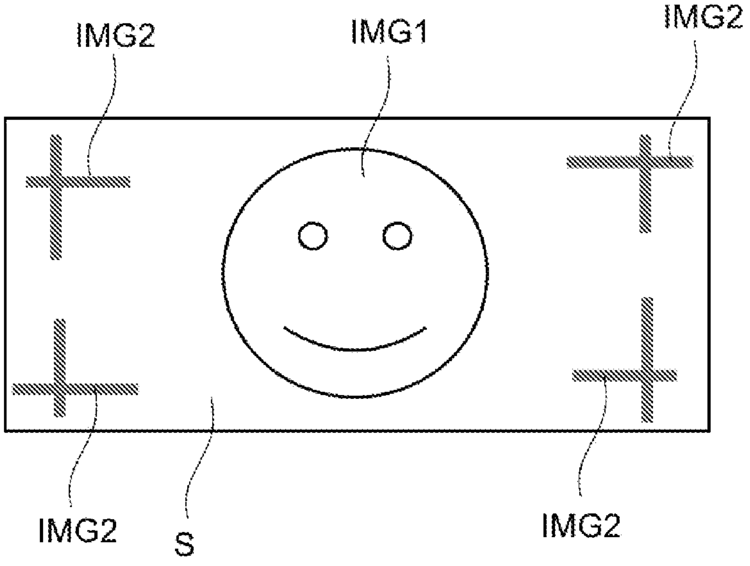
FIG. 3 is a diagram that illustrates an example of a printed image which is printed on a transfer medium according to an embodiment of the present disclosure.

"IMG 1" illustrated in FIG. 3 is a transfer image to be transferred onto the T shirt, and "IMG 2" are positional alignment images. That is, in the present embodiment, the printed image which is printed on the peelable sheet S includes the transfer image to be transferred onto the T shirt and the positional alignment images which are utilized to positionally align the transfer image.

With respect to the positional alignment images which are utilized to positionally align the transfer image, it is necessary for these images to not be transferred onto the T shirt. Therefore, in the present embodiment, the adhesive liquid is coated on the region of the transfer image (transfer region) printed on the peelable sheet S, but the adhesive liquid is not coated on the region of the positional alignment images (non-transfer region).

Figure 4:
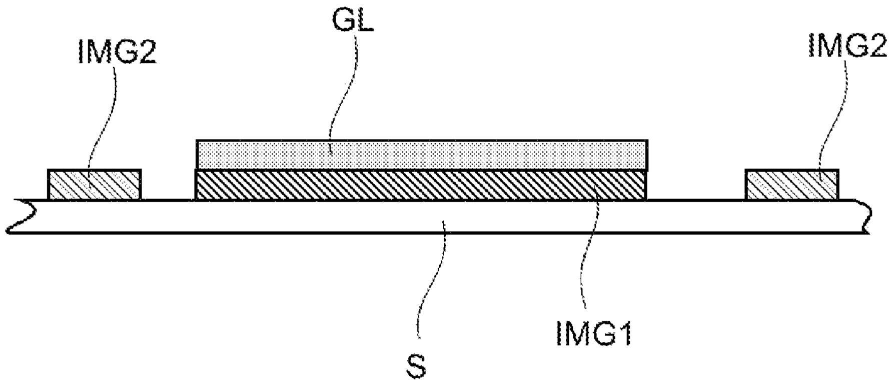
FIG. 4 is a cross sectional diagram in the thickness direction of a transfer medium according to an embodiment of the present disclosure.

Specifically, the control device 2 controls ejection of the adhesive liquid from the inkjet heads of the adhesive liquid coating unit 30 such that the adhesive liquid is only coated on the transfer image from among the transfer image and the positional alignment images which are printed on the peelable sheet S. FIG. 4 is a cross sectional diagram in the thickness direction of a transfer medium. "IMG 1" illustrated in FIG. 4 is the transfer image which is printed on the peelable sheet S, "IMG 2" are the positional alignment images, and "GL" is a layer of an adhesive agent formed on the transfer image. An adhesive layer is formed only on the transfer image, as illustrated in FIG. 4.

The region onto which the adhesive liquid is coated is specified by a user designating a region, for example. Specifically, the control device 2 displays a preview of a print image on a display device 3 connected to the control device 2, based on image data that represents an image to be printed. Then, the control device 2 receives a designation of a transfer image within the preview display of the print image to specify a transfer region, and specifies regions other than the specified transfer region as non-transfer regions. With respect to the designation of the region of the transfer image, the user may input the designation as a setting by employing an input device 4 connected to the control device 2. In the case that the transfer region and the non-transfer region are specified based on image data in the manner described above, the transfer region and the non-transfer region can be specified easily.

Note that the control device 2 may specify a non-transfer region by performing pattern recognition of positional alignment images which are set in advance based on image data that represents an image to be printed, and regions other than the non-transfer region as a transfer region, instead of the user designating a transfer region as described above. Regions at which trim marks are present, for example, may be specified as non-transfer regions.

Alternatively, the control device 2 may generate image data that represents a transfer image in a transfer region and image data that represents positional alignment images in non-transfer regions separately, for example, instead of the control device 2 specifying a transfer region and non-transfer regions in a print image based on image data. In this case, after the control device 2 prints the print image on the peelable sheet S by controlling the printing unit 20 based on the image data that represents the transfer image in the transfer region and image data that represents positional alignment images in the non-transfer regions, the adhesive liquid coating unit 30 may be controlled based only on the image data that represents the transfer image to coat the adhesive liquid. In the case that the adhesive liquid coating unit 30 is controlled based on image data that only includes a print image (transfer image) in a transfer region from among the transfer region and non-transfer regions as described above, the burden on a user in designating a transfer region can be eliminated.

In addition, the control device 2 administers various image processes which are necessary for printing on image data that represents an image to be printed, such as a color converting process and a halftone process.

Figure 5:
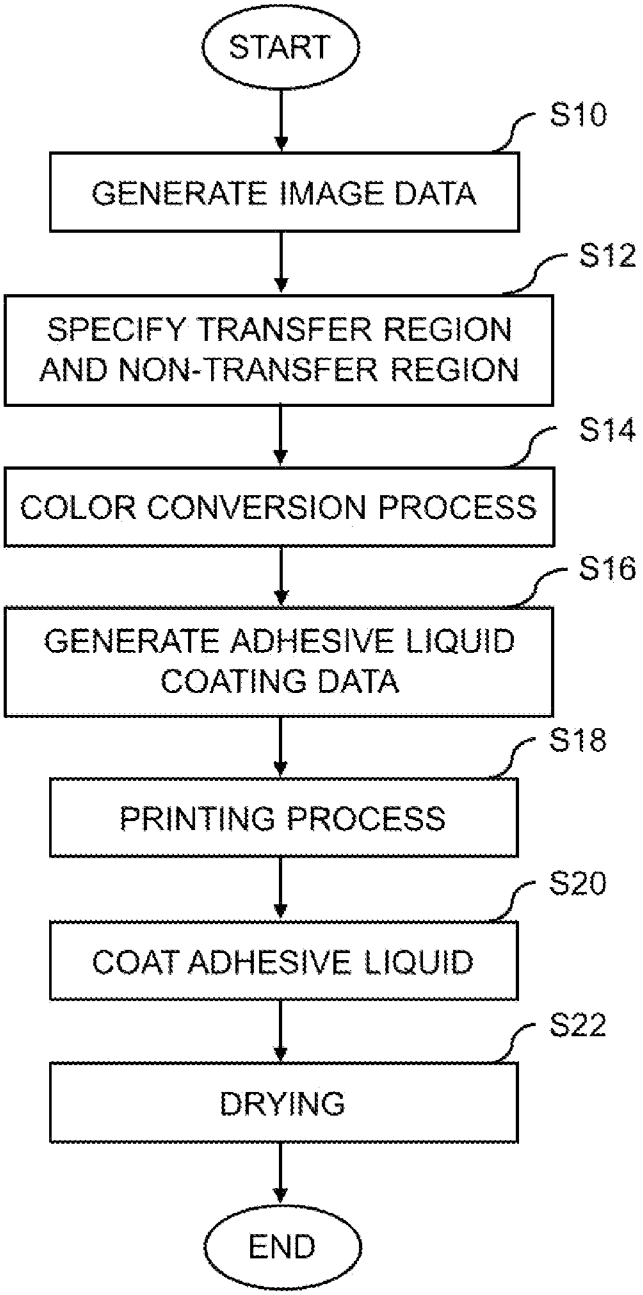
FIG. 5 is a flow chart for explaining the processes which are performed by a transfer medium producing apparatus according to an embodiment of the present disclosure.

Next, the flow of processes which are performed by the transfer medium producing apparatus of the present embodiment will be described with reference to the flow chart illustrated in FIG. 5.

First, the control device 2 generates image data that represents an image to be printed (S10). The image data is generated by a user employing an application which is installed in the control device 2, for example. Alternatively, the control device 2 may receive image data which is read out by a scanner connected to the control device 2.

Then, the control device 2 receives designation of a transfer region by displaying a preview of a print image on the display device 3, to specify a transfer region and non-transfer regions (S12).

Next, the control device 2 administers a color converting process on the generated image data, which is in RGB format, to generate image data in CMYK format (S14).

Then, the control device 2 administers a halftone process on each of the C, M, Y, and K data to generate ink drop data. The ink drop data of the present embodiment is data that defines the number of ink drops to be ejected from one nozzle of an inkjet head in order to form one dot of the print image.

Continuing, the control device 2 generates adhesive liquid coating data based on data regarding the transfer region (S16). The adhesive liquid coating data is data that defines the number of drops of adhesive liquid to be ejected from one nozzle of an inkjet head onto one dot of a transfer image, similar to the ink drop data. Note that in the present embodiment, adhesive liquid coating data that coats the same amount of the adhesive liquid onto each dot that constitutes the transfer image is generated.

Then, the control device 2 controls the inkjet heads for each color of the printing unit 20 based on ink drop data for each color that includes both the transfer region and the non-transfer regions, to print the transfer image and positional alignment images onto the peelable sheet S (S18).

Next, the control device 2 controls the adhesive liquid coating unit 30 based on the adhesive liquid coating data, to coat the adhesive liquid only onto a region (transfer region) of the peelable sheet S where the transfer image is printed (S20).

Then, the peelable sheet S which has been coated with the adhesive liquid is dried by the drying unit 40 (S22), and a transfer medium is produced.

Figure 6:
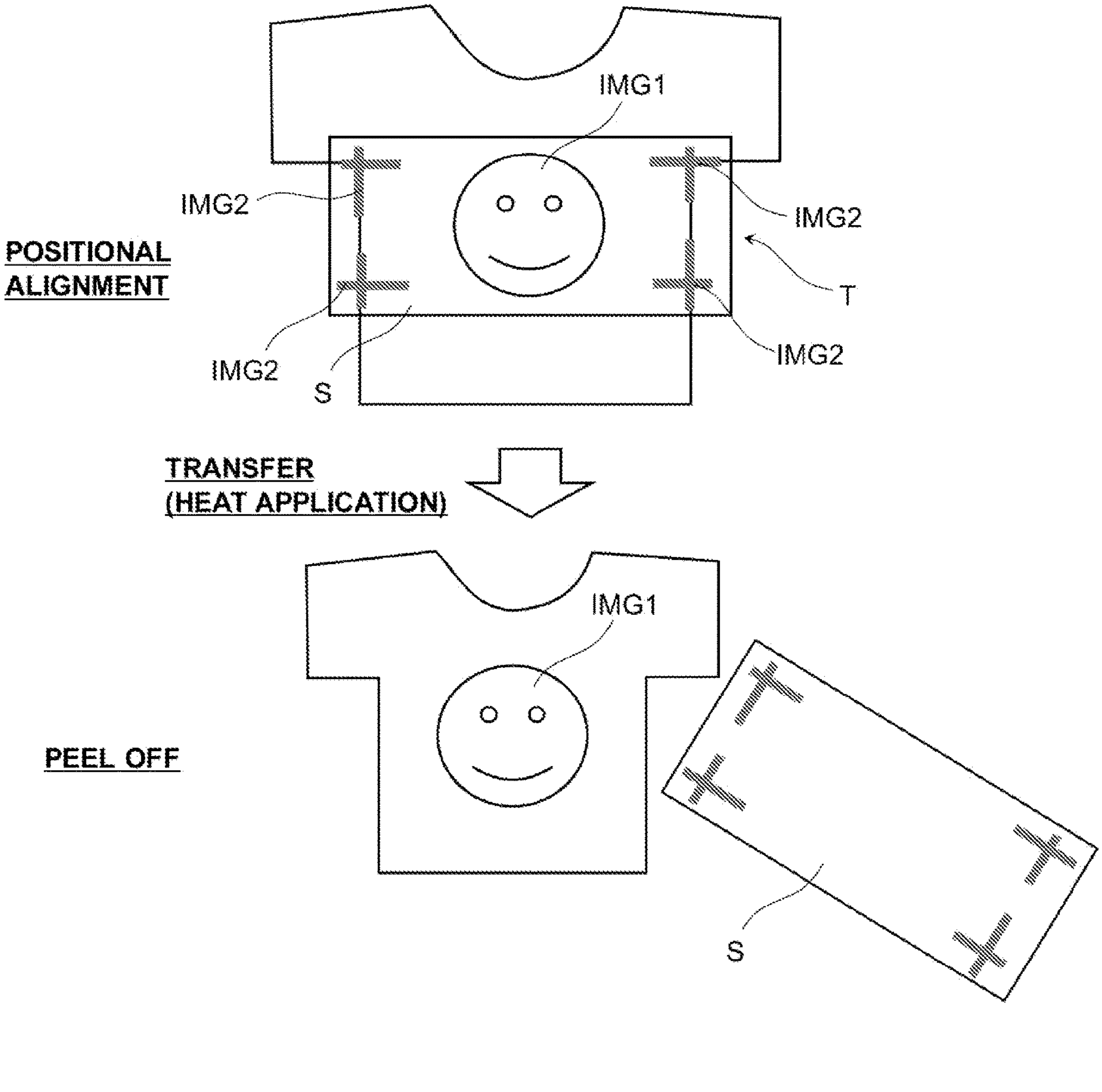
FIG. 6 is a collection of diagrams for explaining a method for transferring a transfer image onto a T shirt employing a transfer medium according to an embodiment of the present disclosure.

FIG. 6 is a collection of diagrams for explaining a method by which a transfer medium produced in the manner described above is employed to transfer a transfer image onto a T shirt. As illustrated in FIG. 6A, the positional alignment images IMG 2 which are printed on a transfer medium T are employed to positionally align the transfer medium T on a T shirt. Specifically, the transfer medium is positionally aligned by setting the positional alignment images at the corners under the sleeves of the T shirt, and also at the edges of the T shirt that extend downward from the sleeves.

Then, the adhesive layer is melted by applying heat and pressure to the transfer medium in the positionally aligned state, and the transfer image IMG 1 is transferred onto the T shirt thereby. At this time, the positional alignment images are not transferred, because the adhesive liquid is coated only onto the transfer image IMG 1 in the present embodiment.

According to the transfer medium producing apparatus of the embodiment described above, the adhesive liquid is coated onto the printed image within the transfer region, from among the transfer region to be transferred onto a target medium for transfer and the non-transfer regions not to be transferred onto the target medium for transfer, which are included in the printed image. Therefore, only a desired printed image within the transfer region can be transferred onto the target medium for transfer. In addition, printed images within the non-transfer regions can be utilized for purposes other than image transfer, thereby improving convenience and utility.

Specifically, in the case of the above embodiment, positional alignment images are printed. Therefore, positional alignment of the transfer image with respect to the T shirt can be facilitated.

Note that in the above embodiment, the printed images within the non-transfer regions are positional alignment images (trim marks). However, the printed images in the non-transfer regions are not limited thereto, and the printed images in the non-transfer regions may be any image, text, or pattern which is desired to be printed but not desired to be transferred onto a target medium for transfer, such as a management barcode and a production date.

Note that the present disclosure is not limited to the embodiment described above. The present disclosure may be realized by modifying the constituent components within a range that does not stray from the scope of the disclosure during execution. In addition, various inventions may be formed by appropriate combinations of the plurality of constituent components of the above embodiment. All of the constituent components which are disclosed in the embodiment may be combined. Various modifications and applications are possible within a scope that does not stray from the spirit of the disclosure.

The additional notes below are also disclosed with respect to the present disclosure.

Additional Note 1

The apparatus for producing a transfer medium of the present disclosure is equipped with: a printing unit that receives image data that represents an image to be printed and prints a print image onto a peelable sheet based on the image data; an adhesive liquid coating unit that coats an adhesive liquid on the peelable sheet on which the print image has been printed; and a control unit that controls the adhesive liquid coating unit such that an adhesive liquid is coated onto a printed image within a transfer region, from between the transfer region to be transferred onto a target medium for transfer and a non-transfer region not to be transferred onto the target medium for transfer, which are included in the printed image.

Additional Note 2

In the apparatus for producing a transfer medium of Additional Note 1, a printed image within the non-transfer region may be a positional alignment image that determines a transfer position of the printed image within the transfer region on the target medium for transfer, onto which the printed image within the transfer region is to be transferred.

Additional Note 3

In the apparatus for producing a transfer medium of Additional Note 1 or Additional Note 2, the control unit may specify the transfer region and the non-transfer region based on the image data.

Additional Note 4

In the apparatus for producing a transfer medium of Additional Note 1 or Additional Note 2, the control unit may control the adhesive liquid coating unit based on image data that includes only the printed image within the transfer region, from between the transfer region and the non-transfer region.

Additional Note 5

The transfer medium of the present disclosure is a transfer medium having a peelable sheet on which a printed image is printed and a layer of an adhesive agent, in which the layer of the adhesive agent is formed on a transfer region, from between the transfer region and a non-transfer region within the printed image.

What is claimed is:

1. An apparatus for producing a transfer medium, comprising:

a printing unit that receives image data that represents an image to be printed and prints a print image onto a peelable sheet based on the image data, wherein the print image includes a printed image within a transfer region and a printed image within a non-transfer region;

an adhesive liquid coating unit that coats an adhesive liquid on the peelable sheet on which the print image has been printed; and a control unit that controls the adhesive liquid coating unit such that an adhesive liquid is coated onto the printed image within the transfer region and not coated on the printed image within the non-transfer region, wherein the transfer region is to be transferred onto a target medium for transfer and the non-transfer region is not to be transferred onto the target medium for transfer, wherein the control unit is configured to determine the non-transfer region by performing pattern recognition to recognize patterns within the image data representing the image to be printed within the transfer region and the image to be printed within the non-transfer region.

2. The apparatus for producing a transfer medium as defined in claim 1, wherein the printed image within the non-transfer region is a positional alignment image that determines a transfer position of the printed image within the transfer region onto the target medium for transfer.

3. The apparatus for producing a transfer medium as defined in claim 1, wherein the control unit controls the adhesive liquid coating unit based on image data that includes only the printed image within the transfer region.

* * * * *